J. R. BAILEY.
Hay Loader.
No. 93,581. 
Patented Aug. 10, 1869.
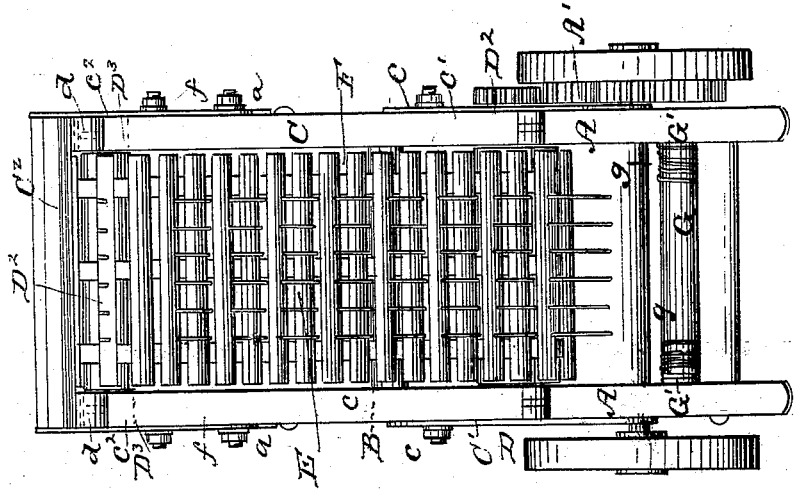
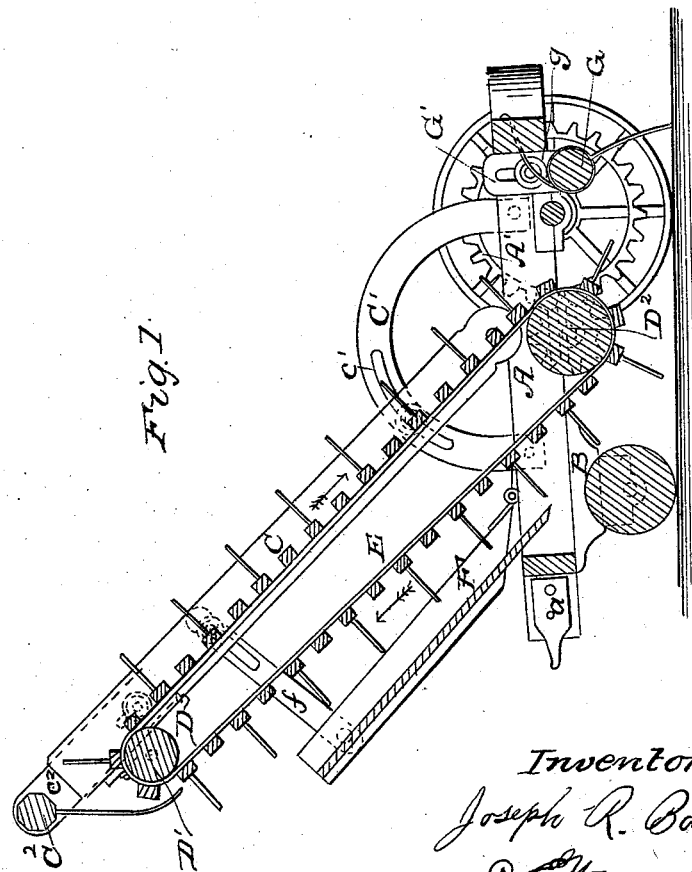
Inventor
Joseph R. Bailey

UNITED STATES PATENT OFFICE.

JOSEPH R. BAILEY, OF WOONSOCKET, RHODE ISLAND, ASSIGNOR TO HIMSELF, SELDEN A. BAILEY, AND ORIN FREEMAN.

IMPROVEMENT IN HAY-LOADERS.

Specification forming part of Letters Patent No. 93,581, dated August 10, 1869.

*To all whom it may concern:*

Be it known that I, JOSEPH R. BAILEY, of Woonsocket, in the county of Providence, and in the State of Rhode Island, have invented new and useful Improvements in Machines for Loading Hay; and I do hereby declare that the following is a full, clear, and exact description thereof, reference being had to the accompanying drawings, and to the letters of reference marked thereon.

Figure 1 represents a vertical longitudinal section of the machine, and Fig. 2 a plan or top view of the same.

My invention relates to that class of agricultural implements called "hay-loaders;" and my improvements consist in the combination and arrangement of the several parts, as hereinafter more fully described.

A A represent the frame or truck of the machine, which may be made of wood, and must have the necessary strength and dimensions to carry the different parts attached to it. It is mounted upon two wheels fast upon the ends of the axle, which has its bearings in blocks secured to the under sides of the truck and at its rear end. The forward ends of the side beams of the truck are provided with straps or hooks $a\ a$, by means of which the machine is attached to the rear end of a wagon or cart. Cast on the inside face of one of the wheels is a toothed rim, A', of such a diameter that its teeth mesh into and drive a pinion on the end of the journal of roller D.

B represents a roller, of suitable diameter, the journals of which have their bearings in blocks secured to the under sides of the side beams of the truck. It is placed under the forward end of it, so that it will compress the hay a little before it is taken up by the endless rake, and enabling the latter to take it up easier and cleaner.

C C represent an adjustable frame, the lower ends of which are hinged to lugs, which extend upward from the side beams of the truck, between the roller and the wheels. It is to be made of the same width as the truck, and of suitable length; and it extends upward from the truck in such a manner as to lean backward, being held in position to the arched bars or plates C' by set-screws $c$. These bars are secured to the sides of the truck, and are provided with slots $c'$, by means of which and the set-screws the adjustable frame may be set at any required angle which is within the length of the slots. Secured to upper ends of this adjustable frame, by the slotted plates or bars $c^2$ and set-screws, extending from side to side, is the adjustable clearing-rake $C^2$, the office of which is to clear the teeth of the endless rake of any hay which may hang to them; to accomplish which the teeth of the latter are made to move between those of the adjustable clearing-rake. Its slotted bars admit of its being adjusted relatively to the endless rake.

D and D' represent two rollers, over which the endless rake moves. The journals of the rollers D have their bearings in blocks secured to the under sides of the truck, directly under the center of the lugs to which the adjustable frame is hinged; and one of these journals extends a short distance beyond such block, and carries upon this portion, fast upon it, the pinion $D^2$, which is made of such a diameter that its teeth mesh into the teeth of the rim A', by which it is made to revolve. The journals of the roller D' are placed in the adjustable blocks $D^3$, which are secured to the under sides of the adjustable frame, near its upper end. These blocks have slots $d$ in their flanges, by means of which they may be adjusted so as to diminish or increase the distance between the rollers D and D', and thus give the required tension to the endless rake, and keep it taut.

E represents the endless rake, which moves over the rollers last alluded to, in the direction indicated by the arrows in Fig. 1. It consists of three (more or less) endless belts, across which bars of wood are secured at suitable distances from each other, and having such length that they may move freely between the sides of the adjustable frame. Each alternate bar is provided with a number of teeth, which are made of such a length that as the bars move successively around the lower roller, D, their teeth just touch the surface of the ground and take up with them any hay which may be before them. If the teeth of the endless rake should meet with any obstruction, they will move somewhat, or the belt will slip sufficiently to overcome it.

F represents an adjustable apron, which is attached to the truck and the adjustable frame, under the endless rake, just clear of its teeth, having about the same inclination which is given to the frame. It extends across the truck, and its length is such that when the machine is attached to a wagon or cart its upper end leans over the rear end of the latter. It will be seen that by this arrangement all the hay which has been taken up by the endless rake will be deposited in the wagon or cart. The lower ends of the sides of this apron are attached to the side beams of the truck by hinges, while the upper end is suspended from the adjustable frame by the slotted bars $ff$, by means of the slots of which it can be adjusted properly.

G represents the after-rake, the office of which is to rake up any hay which may not have been taken up by the endless rake, to accomplish which it is placed in rear of the latter. Its journals have their bearings in the slotted plates G', which are held to the sides of the truck by means of set-screws. The slots in these plates allow of the proper adjustment of the after-rake. Its ends are surrounded by springs $g$, one end of which is secured to the rake, while the other end extends from it and is secured to the cross-beam of the truck in such a manner that by the action of the springs the teeth of the after-rake are held to their work, and at the same time enough play given them to overcome any obstruction which may be met with.

The operation of the machine is as follows: It having been attached to the rear end of a wagon or cart, and its several adjustable parts properly adjusted and secured, the wagon is drawn forward over the hay-field, drawing after it the loader. By the revolution of the wheels of the latter the endless rake is made to move over its rollers, and hay is taken up by it and deposited in the wagon at the rate of speed at which the machine is moved. If the field is not cleaned by the endless rake, the after-rake will finish up, and hay gathered by it may be taken from before it from time to time.

If it is found that the machine is not heavy enough in itself, I propose to load it with stone or other materials until it has the required weight.

Having thus described my invention, what I claim, and desire to secure by Letters Patent, is—

1. The combination of the roller B with the endless rake E, substantially as and for the purpose set forth.

2. The combination of the truck A, adjustable after-rake G, adjustable apron F, adjustable frame C, arched bars C', clearing-rake C², endless rake E, and roller B, substantially as shown and described.

3. The combination and arrangement of the truck A, adjustable frame C, arched bars C', endless rake E, and adjustable apron F, with slotted bars $f$, substantially as shown and described.

The above specification signed by me this 26th day of May, 1869.

JOSEPH R. BAILEY.

Witnesses:
GEORGE A. WILBUR,
FRANCIS L. O'REILLY.